United States Patent
Irvin et al.

(10) Patent No.: US 6,518,921 B1
(45) Date of Patent: Feb. 11, 2003

(54) CELLULAR POSITIONING SYSTEM THAT COMPENSATES FOR RECEIVED SIGNAL DELAYS IN POSITIONING RADIO RECEIVERS

(75) Inventors: David R. Irvin, Raleigh, NC (US); Rajaram Ramesh, Cary, NC (US); Karl Molnar, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 798 days.

(21) Appl. No.: 08/838,027

(22) Filed: Apr. 22, 1997

(51) Int. Cl.[7] ............................. G01S 1/24; G01S 3/02
(52) U.S. Cl. ...................................... 342/387; 342/457
(58) Field of Search .................. 342/387, 457, 342/464; 455/456

(56) References Cited

U.S. PATENT DOCUMENTS

| | | | |
|---|---|---|---|
| 3,780,370 A | | 12/1973 | Reeves |
| 3,848,254 A | * | 11/1974 | Drebinger et al. ........... 342/457 |
| 4,636,795 A | * | 1/1987 | Dano ........................... 342/387 |
| 5,058,200 A | * | 10/1991 | Huang et al. .................. 455/33 |
| 5,144,315 A | * | 9/1992 | Schwab et al. ................ 342/49 |
| 5,263,189 A | * | 11/1993 | Kultgen et al. ............. 342/174 |
| 5,327,144 A | | 7/1994 | Stilp et al. ................... 342/387 |

FOREIGN PATENT DOCUMENTS

DE 40 05 368 A1 8/1991

OTHER PUBLICATIONS

Stilp, Louis A., "Time Difference of Arrival Technology for Locating Narrowband Cellular Signals." Wireless Technologies and Services for Cellular and Personal Communication Services, vol.SPIE 2602, Oct. 25, 1995–Oct. 26, 1996, Philadelphia, USA, pp. 134–144, XP 002046631.*

Mouly, Michel et al., "The Pseudo–synchronlsation, a Costless Feature to Obtain the Gains of a Synchronised Cellular Network." MRC Mobile Radio Conference; Nov. 13, 1991, pp 51–55, XP 000618384.*

Song, Han–Lee, "Automatic Vehicle Location in Cellular Communications Systems." IEEE Transactions on Vehicular Technology, vol. 43, No. 4, Nov. 1, 1994, pp 902–908, XP000493419.*

Louis A. Stilp, Time Difference Of Arrival Technology For Locating Narrowband Cellular Signals, 134/SPIE vol. 2602.

* cited by examiner

*Primary Examiner*—Gregory C. Issing
(74) *Attorney, Agent, or Firm*—Myers Bigel Sibley & Sajovec

(57) ABSTRACT

A positioning system locates a mobile unit by compensating for component tolerances in time-of-arrivals of received signals at a plurality of positioning radio receivers. The system determines detection times of the received radio signals at the positioning radio receivers. The system takes into account pre-stored signal delays associated with one or more receiver stages of the corresponding positioning radio receivers and the detection times, for determining time-of-arrivals for the received radio signals.

26 Claims, 3 Drawing Sheets

CELLULAR POSITIONING SYSTEM THAT COMPENSATES FOR RECEIVED SIGNAL DELAYS IN POSITIONING RADIO RECEIVERS

BACKGROUND

This invention generally relates to the field of communication systems and, more particularly, to compensating for received signal delays in positioning radio receivers.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that the radiocommunication system be able to determine a location of the mobile unit, particularly in the case where the subscriber does not know his or her precise location. Moreover, it is expected that the FCC will soon require that network operators forward the position of an emergency caller to the emergency service provider.

There are many techniques available to generate mobile unit position information. In one positioning system, the mobile unit could estimate its own position and send a message with its coordinates when placing an emergency call. This could be accomplished by, for example, providing the mobile unit with a Global positioning System (GPS) receiver that receives location information from the GPS satellite network. The mobile unit can then transmit this information to the system, which would then forward it to the emergency service provider. This requires, however, significant modification of existing mobile units to include GPS receivers, as well as additional signalling between the mobile units and base stations.

Alternatively, the base stations which transmit signals to, and receive signals from, the mobile units could be used to determine the mobile unit's location. Various techniques, including attenuation of a mobile unit's signal, angle-of-arrival, and difference between the time-of-arrival (TDOA) of a mobile unit's signal at different base stations, have been suggested for usage in providing mobile unit location information. See, for example, the article entitled "Time Difference of Arrival Technology for Locating Narrowband Cellular Signals" by Louis A. Stilp, SPIE Vol. 2602, pp. 134–144. Another system used for locating mobile units in radiocommunication systems is an adjunct system that operates independent of the radiocommunication system. The adjunct system includes its own base stations for locating the mobile unit. The adjunct system may, however, share various components (e.g., an antenna) with the radiocommunication system but processes signals separately. This may be advantageous, for example, as an expedient solution to providing mobile unit location without modifying the large number of existing base stations in a system.

For determining the position of a target mobile unit, some positioning algorithms rely on received signal time-of-arrivals reported from three positioning radio receivers at three or more locations. By processing the time-of-arrivals, the position of the target mobile unit is determined by way of a known constant-radius-circle position-determination algorithm. This algorithm relies on the point of intersection of at least three circles with radiuses corresponding to the time-of-arrivals reported from the positioning receivers.

In practice, a positioning radio receiver, however determines a detection time corresponding to the time when the received signal from the target mobile unit is detected, rather than the time when the received signal actually arrives at the positioning radio receiver. The detection time is the time at which the received signal emerges from the receiver's detector, having made its way through the receiver's various RF and IF stages, which add signal delays to the detection of the received signal. Under ideal conditions, the distinction between detection time and arrival time would be insignificant. Because each receiver in a given positioning system would introduce the same amount of delay, which could be readily removed by the system's position-determination algorithm. Due to component tolerances, however, the assumption that the various positioning receivers will have equal delay is not valid.

For example, certain kinds of IF filters vary greatly in group delay—the time required to propagate energy through the filter—even for nominally identical components. Empirical data suggest that ceramic IF filters, which are widely used in receivers because of their favorable cost/performance characteristics, show group-delay variations of about plus-or-minus 100 nanoseconds from mean. As a result, the determination of position is subject to various uncertainties and tolerances, which result in position inaccuracy and ambiguity. In a positioning system otherwise under ideal conditions, a 100-nanosecond uncertainty in time-of-arrival of the received signal introduces a positional uncertainty of about 30 meters (about 100 feet). Referring to FIG. 1, the position uncertainty caused by plus-or-minus 100 nano second is shown by hashed lines between the crossings of the circles corresponding to time of arrivals of a first positioning radio receiver and a second positioning radio receiver that are used for determining the position of the mobile unit. Each positioning radio receiver is represented by two co-centric circles with radiuses showing the plus-of-minus 100 nano second uncertainty. Thus, positioning radio receivers that have components, e.g., IF filters, drawn from the extremes of tolerance distributions subject a system to positioning errors and ambiguities on the order of several hundred feet. Therefore, there exists a need for a positioning system that compensates for positional uncertainty introduced by component tolerances in positioning radio receivers.

SUMMARY

The present invention that addresses this need is exemplified in a positioning system that improves positioning accuracy by measuring and pre-storing signal delays associated with positioning radio receivers. Accordingly, the positioning system for locating the mobile unit according to the present invention includes a detector that detects a received radio signal from the mobile unit by a corresponding positioning radio receiver, and a timing device that determines a detection time associated with the received signal. A processor determines a time-of-arrival for the received radio signal based on the detection time and a measured or computed signal delay that is pre-stored is a storage device. A mobile unit locator processes time-of-arrivals from a plurality of positioning radio receiver to locate the mobile unit.

According to more detailed features of the invention, the signal delay includes a measured or computed group delay associated with a filter included in one of the receiver stages and a measured or computed transmission-line delay associated with a transmission line included in radio receiver. Preferably, the time-of-arrival is based on the difference between the signal delay and the detection time. In an exemplary embodiment, however, the time-of-arrival may be based on the detection time and a delta value derived from the difference of the signal delay relative to a nominal value.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
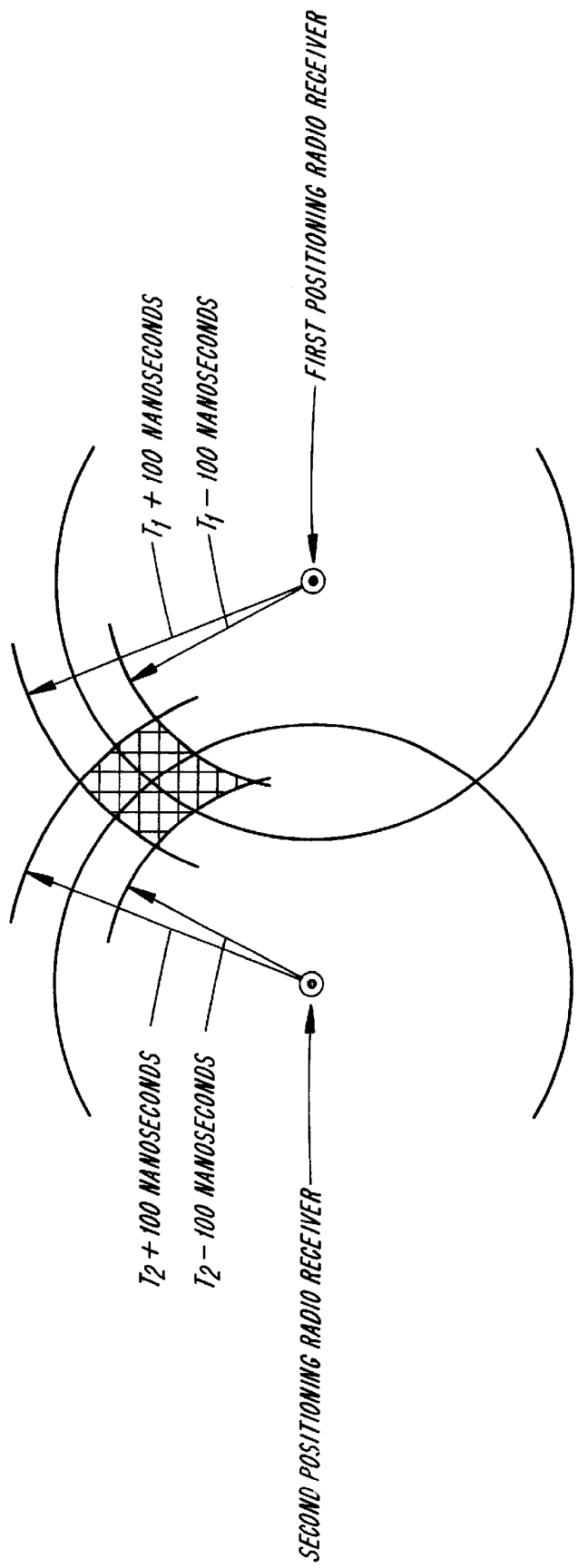
FIG. 1 is a diagram showing positional inaccuracies associated with positioning a mobile unit using a conventional positioning radio receiver.

Referring to FIG. 1, a positioning system 1 that advantageously incorporates the present invention is shown. In an exemplary embodiment, the positioning system 1 is an adjunct positioning system similar to the one disclosed in U.S. Pat. No. 5,327,144 to Stilp et al., entitled "Cellular Telephone Location System", the disclosure of which is incorporated here by reference. As it will become apparent later in the disclosure, in addition to adjunct positioning systems, non-adjunct positioning systems could equally take advantage of the present invention. The positioning system 1 includes three positioning radio receivers 2, 3, 4 that are not necessary co-located with the base stations of a cellular radiocommunication system within which a plurality of subscriber mobile units operates. Also shown is a cellular system base station 5 that supports radiocommunication within a cell 6 and, in particular with a mobile unit 7 whose location is to be determined according to the present invention. The positioning radio receivers 2, 3 and 4 monitor accesses to the system by the mobile unit 7. When the mobile unit 7 makes an emergency access, the positioning system 1 processes time-of-arrivals of signals received from the mobile unit 7 at the positioning receivers 2, 3 and 4 to determine the position of mobile unit 7 using, for example, the well known constant-radius-circle position-determination algorithm. In an exemplary embodiment, the processing of the time-of-arrivals from the positioning radio receiver 2, 3, 4 takes place in a central station 8 that reports the position information of the mobile unit 7 to an emergency service center 9.

According to the present invention, a measured or computed signal delay associated with one or more receiver stages of the positioning radio receivers 2, 3, 4 is pre-stored either in each one of the positioning radio receivers or in the central station 8. When determining the position of the mobile unit 7, a mobile unit position locator 5 incorporated in the central station 8 processes time-of-arrivals that are derived based on the signal delays of corresponding positioning radio receivers. Therefore, unlike conventional methods, the present invention takes into account pre-stored variations of signal delays associated with the positioning radio receivers when making positioning determination. By measuring and pre-storing the signal delays, the positioning system of the invention can accurately locate the mobile unit 7 without introducing uncertainties associated with component tolerances of the positioning radio receivers 2, 3, 4.

Figure 2:
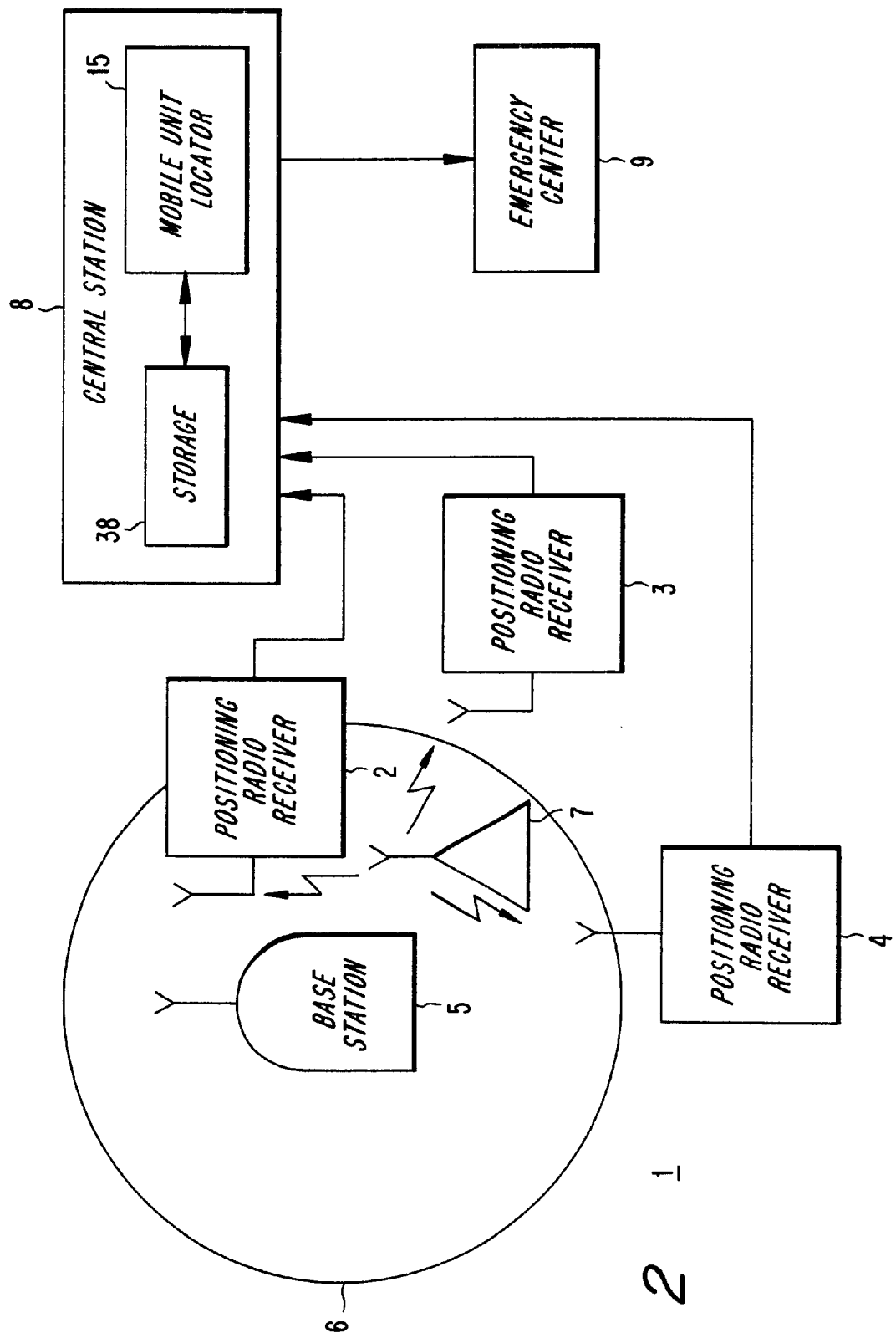
FIG. 2 is a block diagram of a positioning system that advantageously incorporates the present invention.
Figure 3:
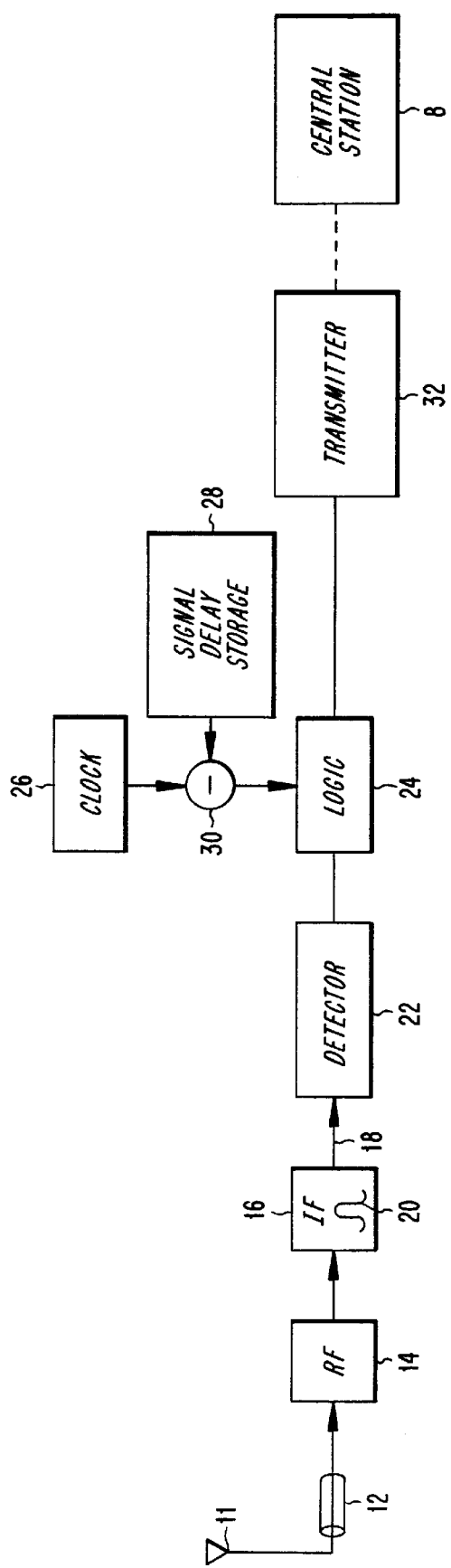
FIG. 3 is a block diagram of a positioning radio receiver used in the system of FIG. 2.

Referring to FIG. 3, a block diagram of one positioning radio receiver 10 of the positioning system is shown. The positioning radio receiver 10 includes a plurality of receiver stages each of which may introduce a measurable signal delays to the detection of the received signal. As shown, a receiver antenna 11 receives a transmitted signal from the mobile unit 7 (shown in FIG. 2) and applies it to an RF stage 12 through a transmission line 14. It is well known that the transmission line 14 connecting the antenna 11 to the RF stage 12 delays the received signal by a transmission-line delay. The RF stage 12, which provides pre-amplification and receiver selectivity, applies the received signal to an IF stage 16 for down conversion in a well known manner. The IF stage 16 provides an IF signal on line 18 that contains the information carried by the received signal. In order to provide the IF signal, the IF stage 16 uses an IF filter 20, for example, a ceramic filter, which introduces an additional group-delay. Therefore, the signal delay of the received signal includes both the transmission-line delay and the group-delay. The IF signal is applied to a detector 22 that detects the received signal at a detection time. The positioning radio receivers measures the detection time using a well known logic circuit 24 and timing device, such as a clock device 26.

In the present invention, the transmission-line delay and the group-delay are measured or computed according to well known methods that determine signal delay associated with RF stages of a received signal. For example, the signal delay for each positioning radio receiver 2, 3, 4 may be measured at time of manufacture or time of installation by a technician that uses a dual-trace oscilloscope or automated means. The transmission line delay may be measured or computed based on line length and velocity factor. The value of the signal delay, which is usually in nanoseconds range, is pre-stored in a signal delay storage device 28, preferably as a binary coded decimal number. The storage device may 28 represents the pre-stored binary coded decimal number by means of a DIP switch or by means of binary bytes or words stored in a non-volatile memory device.

In one exemplary embodiment of the invention, the positioning radio receiver 10 subtracts, using a subtractor 30, the pre-stored signal delay from the detection time to determine the actual time-of-arrival of the received signal. Under this arrangement, the positioning radio receiver 10 reports the time-of-arrival time to the central station 8 for processing with other time-of-arrivals received from other similar positioning radio receivers. The positioning radio receiver reports the time-of-arrival by means of a transmitter 32 that is linked to the central controller through either a wired or a wireless transmission medium.

Figure 4:
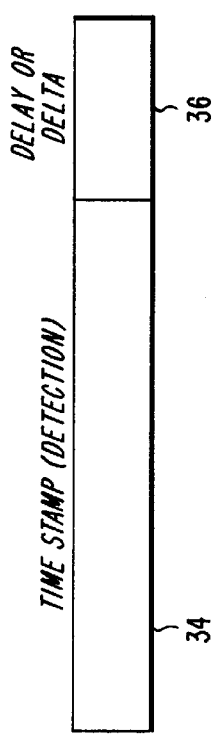
FIG. 4 is a diagram of a delay message used for transmitting a signal delay associated with the receiver of FIG. 3.

According to one variation of the invention, the positioning radio receiver 10 sends the signal delay to the central station 8 along with the detection time. For example, in one variation, the positioning radio receiver 10 transmits to the central station 8 a digitally encoded delay message having two fields. As shown in FIG. 4, a first field 34 conveys the detection time, and a second field 36 conveys the receiver's signal delay. In another variation, the second field 36 may contain a delta value corresponding to the difference between the signal delay relative to a nominal value. Under this arrangement, the central station 8 is responsible for subtracting the signal delay from the detection time to determine the time-of-arrival. The positioning radio receiver 10 may convey the delay message to the central station 8 occasionally or periodically in order to provide updated position information. Under this arrangement, the central station 8, which may store the transmitted delay messages, would subtract the pre-stored signal delay from the periodically updated detection times for determining the time-of-arrivals on a continuous basis.

Referring back to FIG. 2, according to another aspect of the present invention, the central station 8 includes a central storage device 38 for storing the signal delay associated with each one of the positioning radio receivers. According to this aspect of the invention, the signal delay is determined at time of system installation using a reference signal source at a known location that is, preferably, equidistant from each of the positioning receivers. By determining the time-of-arrivals from the reference signal source, the signal delay associated with each one of the positioning radio receivers may be measured. The signal delays of the radio positioning receivers 2, 3 and 4 may be stored in the central storage device 38. The stored signal delays may then be retrieved by the mobile position locator 15, which also receives the detection times transmitted from the positioning radio receivers 2, 3, 4 during the processing of the time-of-arrivals, for locating the mobile unit 7.

From the foregoing description it would be appreciated that the present invention introduces accuracy into positioning algorithms that use time-of-arrivals for locating mobile units by removing tolerance variations associated with the components used in the positioning radio receivers. In this way, the present invention can be used in any communication system, adjunct or non-adjunct, to accurately locate a mobile unit.

Although the invention has been described in detail with reference only to the presently preferred embodiment, those skilled in the art will appreciate that various modifications can be made without departing from the invention. Accordingly, the invention is defined only by the following claims which are intended to embrace all equivalents thereof.

What is claimed is:

1. An apparatus for locating a mobile unit using a plurality of positioning radio receivers, comprising:
    a detector that detects a received radio signal from the mobile unit at a corresponding positioning radio receiver;
    a timing device that determines a detection time associated with the received signal;
    a storage device that stores a signal delay associated with one or more receiver stages of the corresponding positioning radio receiver; and
    a processor that determines a time-of-arrival for the received radio signal based on the detection time and the signal delay, and
    a mobile unit locator that processes time-of-arrivals at the plurality of positioning radio receiver to determine the position of the mobile unit.

2. The apparatus of claim 1, wherein the signal delay corresponds to a group delay associated with a filter included in one of the receiver stages.

3. The apparatus of claim 1, wherein the signal delay corresponds to a transmission-line delay.

4. The apparatus of claim 1, wherein the time-of-arrival is based on the difference between the signal delay and the detection time.

5. The apparatus of claim 1, wherein the time-of-arrival is based on the detection time and a delta value derived from the difference of the signal delay to a nominal value.

6. The apparatus of claim 1, wherein the signal delay is determined using a reference signal source at a known location that is equidistant from each of the positioning receivers.

7. A positioning radio receiver, comprising:
    one or more receiver stages that process a received radio signal;
    a storage device that pre-stores a signal delay associated with the one or more receiver stages;
    a detector that produces a detection time corresponding to a time when the received radio signal is detected by one of the receiver stages; and
    a transmitter for transmitting time of arrival information based on the detection time and the signal delay.

8. The radio receiver of claim 7, wherein one of the receiver stages includes a filter, and wherein the signal delay corresponds to a group delay associated with the filter.

9. The radio receiver of claim 7, wherein the receiver includes a transmission line, and wherein the signal delay corresponds to a transmission-line delay associated with the transmission line.

10. The radio receiver of claim 7, wherein the transmitter transmits the time-of-arrival information device based on the difference between the signal delay and the detection time.

11. The radio receiver of claim 7, wherein transmitter transmits the time-of-arrival information that include the signal delay and the detection time.

12. The radio receiver of claim 7, wherein the time-of-arrival information is based on a delta value derived from the difference of the signal delay to a nominal value.

13. The radio receiver of claim 7, wherein the transmitter transmits time-of-arrival the information periodically.

14. A method for positioning a mobile unit, comprising:
    detecting a received radio signal from the mobile unit by at least one corresponding positioning radio receiver;
    determining a detection time associated with the received signal;
    retrieving a pre-stored signal delay associated with one or more receiver stages of the corresponding positioning radio receiver; and
    determining a time-of-arrival for the received radio signal based on the detection time and the pre-stored signal delay.

15. The method of claim 14 further including processing time-of-arrivals from a plurality of positioning radio receiver to determine the position of the mobile unit.

16. The method of claim 14, wherein the signal delay corresponds to a group delay associated with a filter included in one of the receiver stages.

17. The method of claim 14, wherein the signal delay corresponds to a transmission-line delay associated with a transmission line included in the receiver.

18. The method of claim 14, wherein the time-of-arrival is based on the difference between the signal delay and the detection time.

19. The method of claim 14, wherein the time-of-arrival is based on the detection time and a delta value derived from the difference of the signal delay relative to a nominal value.

20. A positioning system for locating a mobile unit, comprising:
    a plurality of positioning radio receivers that each one includes:
        one or more receiver stages that process a received radio signal;

a detector that produces a detection time corresponding to a time when the received radio signal is detected by one of the receiver stages; and a central station that includes:

a storage device that stores signal delays associated with each one of the positioning radio receiver; and a mobile unit locator that processes time-of-arrivals from the plurality of positioning radio receivers to determine the position of the mobile unit, wherein the time of arrivals are derived based on the detection times from the positioning radio receives and the signal delays.

21. The cellular positioning system of claim 20, wherein the signal delays are pre-stored in the central station.

22. The cellular positioning system of claim 20, wherein the signal delays are transmitted from the positioning radio receivers.

23. The cellular positioning system of claim 20, wherein each one of the receivers includes a filter, and wherein the signal delays corresponds to group delays associated with the filters of the receivers.

24. The cellular positioning system of claim 20, wherein each one of the receivers includes a transmission line, and wherein the signal delays corresponds to transmission-line delays associated with the receivers.

25. The cellular positioning system of claim 20, wherein the time-of-arrivals are based on the differences between the signal delays and the detection time of the receivers.

26. The cellular positioning system of claim 20, wherein the signal delay is determined using a reference signal source at a known location that is equidistant from each of the positioning receivers.

* * * * *